United States Patent
Schelstraete

(10) Patent No.: US 12,501,474 B2
(45) Date of Patent: *Dec. 16, 2025

(54) TERMINATION OF WIRELESS TRANSMISSION OF A DATA FRAME

(71) Applicant: MAXLINEAR, INC., Carlsbad, CA (US)

(72) Inventor: Sigurd Schelstraete, Menlo Park, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,696

(22) Filed: Jan. 23, 2024

(65) Prior Publication Data

US 2024/0172265 A1 May 23, 2024

Related U.S. Application Data

(63) Continuation of application No. 17/823,209, filed on Aug. 30, 2022, now Pat. No. 11,882,589, which is a
(Continued)

(51) Int. Cl.
*H04W 72/12* (2023.01)
*H04W 72/02* (2009.01)
(Continued)

(52) U.S. Cl.
CPC ....... *H04W 72/56* (2023.01); *H04W 72/0446* (2013.01)

(58) Field of Classification Search
CPC ..... H04W 76/14; H04W 72/21; H04W 72/23; H04W 76/27; H04W 76/15; H04W 76/10;
(Continued)

(56) References Cited

U.S. PATENT DOCUMENTS 11,596,005 B2 * 2/2023 Jang ................. H04W 56/0045
11,882,589 B2   1/2024 Schelstraete
(Continued)

FOREIGN PATENT DOCUMENTS

CN   107223318 A   9/2017
CN   109964521 A   7/2019
(Continued)

OTHER PUBLICATIONS

Office Action of Chinese Patent Application No. 202011446805.0 mailed Jan. 11, 2025, 26 pages with translations.

*Primary Examiner* — Sai Aung
(74) *Attorney, Agent, or Firm* — Buchalter; Jason W. Croft

(57) ABSTRACT

Example operations may include initiating wireless transmission of a first data frame of data designated for wireless transmission. The wireless transmission of the first data frame may be via a first wireless signal packet configured to carry the data of the first data frame. The operations include directing termination of the wireless transmission of the first data frame via the first wireless signal packet prior to wireless transmission, via the first wireless signal packet, of all of the data of the first data frame. In addition, the operations include directing, in response to termination of transmission of the first data frame, wireless transmission of a termination signal, the termination signal indicating that transmission of the first data frame via the first wireless signal packet terminated prior to completion of transmission of all of the data of the first data frame via the first wireless signal packet.

18 Claims, 8 Drawing Sheets

Related U.S. Application Data continuation of application No. 16/797,888, filed on Feb. 21, 2020, now Pat. No. 11,464,023.

(51) Int. Cl.
*H04W 72/0446* (2023.01)
*H04W 72/56* (2023.01)
*H04W 74/00* (2009.01)

(58) Field of Classification Search
CPC ........... H04W 74/006; H04W 72/0453; H04W 72/0446; H04W 72/51; H04W 72/04; H04W 74/002
See application file for complete search history.

(56) References Cited

U.S. PATENT DOCUMENTS

| | | | |
|---|---|---|---|
| 2003/0125050 A1 | 7/2003 | Takatori et al. | |
| 2008/0259864 A1* | 10/2008 | Zellner | H04W 4/24 370/329 |
| 2012/0201156 A1 | 8/2012 | Sugimoto et al. | |
| 2014/0254477 A1 | 9/2014 | Fricke | |
| 2015/0003371 A1 | 1/2015 | Park et al. | |
| 2015/0230267 A1* | 8/2015 | Lee | H04W 72/23 370/336 |
| 2016/0150566 A1 | 5/2016 | Lee et al. | |
| 2016/0323089 A1* | 11/2016 | Hirsch | H04W 72/0446 |
| 2017/0237463 A1 | 8/2017 | Zheng et al. | |
| 2017/0318566 A1* | 11/2017 | Deogun | H04W 76/28 |
| 2018/0035467 A1* | 2/2018 | Kudo | H04W 16/14 |
| 2018/0139653 A1* | 5/2018 | Lee | H04W 28/0278 |
| 2018/0167870 A1 | 6/2018 | Masini et al. | |
| 2019/0053324 A1* | 2/2019 | Tseng | H04W 76/30 |
| 2019/0158229 A1* | 5/2019 | Wei | H04L 1/1848 |
| 2019/0268885 A1 | 8/2019 | Atungsiri et al. | |
| 2020/0107356 A1* | 4/2020 | Rico Alvarino | H04W 72/21 |

FOREIGN PATENT DOCUMENTS

| | | |
|---|---|---|
| EP | 3277045 B1 | 7/2019 |
| WO | 2010015886 A1 | 2/2010 |

\* cited by examiner

TERMINATION OF WIRELESS TRANSMISSION OF A DATA FRAME

CROSS REFERENCE TO RELATED APPLICATION

This application is a continuation of U.S. patent application Ser. No. 17/823,209, filed on Aug. 30, 2022, which is a continuation of U.S. patent application Ser. No. 16/797,888, filed on Feb. 21, 2020; each of which is incorporated herein by reference in its entirety.

FIELD

The implementations discussed in the present disclosure relate to termination of wireless transmission of a data frame.

BACKGROUND

Unless otherwise indicated in the present disclosure, the materials described in the present disclosure are not prior art to the claims in the present application and are not admitted to be prior art by inclusion in this background section.

Some wireless communication protocols (e.g., the IEEE 802.11 standard) are such that once a device begins transmitting a frame of data ("data frame" or "frame") over a particular wireless channel (e.g., using a particular carrier frequency), the particular channel is unavailable for transmission of other frames until transmission of the current frame has finished.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

Example operations may include initiating wireless transmission of a first data frame of data designated for wireless transmission. The wireless transmission of the first data frame may be via a first wireless signal packet configured to carry the data of the first data frame. The operations include directing termination of the wireless transmission of the first data frame via the first wireless signal packet prior to wireless transmission, via the first wireless signal packet, of all of the data of the first data frame. In addition, the operations include directing, in response to termination of transmission of the first data frame, wireless transmission of a termination signal, the termination signal indicating that transmission of the first data frame via the first wireless signal packet terminated prior to completion of transmission of all of the data of the first data frame via the first wireless signal packet.

BRIEF DESCRIPTION OF THE DRAWINGS

Example implementations will be described and explained with additional specificity and detail using the accompanying drawings in which.

DETAILED DESCRIPTION

Figure 1A:
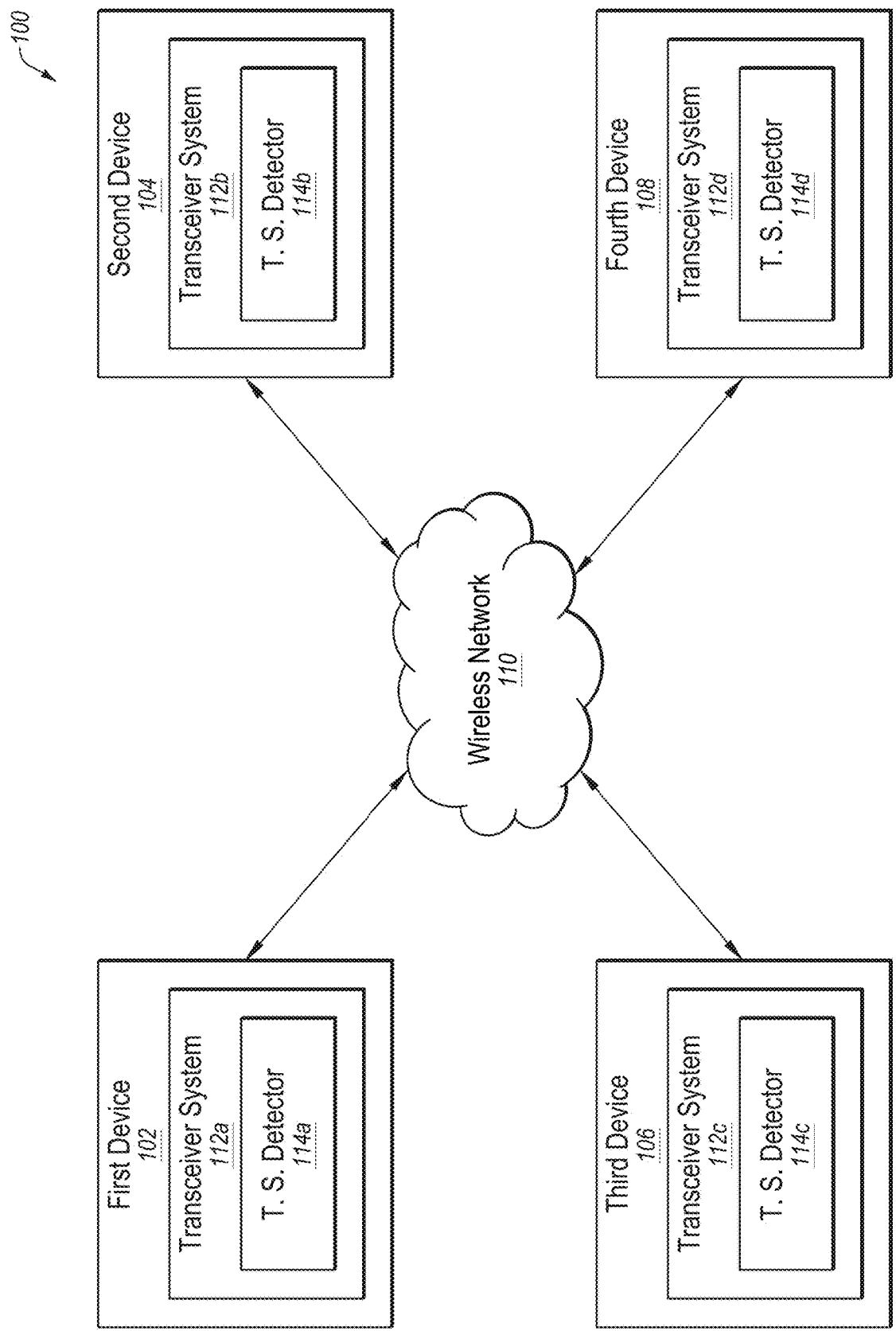
FIG. 1A illustrates an example environment within which wireless communication of a data frame may be terminated prematurely.

Implementations described herein may generally include systems and methods related to terminating wireless transmission of a data frame prior to all of the data of the data frame being transmitted. Further, the systems and methods may be related to generation and detection of a termination signal that indicates that the transmission of the data frame has ended prematurely. The early termination of data frame transmission and subsequent transmission and detection of a corresponding termination signal may allow for the transmission of higher priority data to interrupt and supersede the transmission of lower priority data.

For example, the early termination of data frame transmission and subsequent transmission and detection of a corresponding termination signal may facilitate the use of wireless communication in the transmission of time-sensitive data, which may prioritize the transmission of some data over other data. For instance, the implementations described herein may allow for interruption of transmission of data frames that are not time-sensitive data such that time-sensitive data frames may be transmitted instead. Example environments and instances that may incorporate time-sensitive networking include control networks, safety-critical networks, and mixed media environments that communicate data that may have varying levels of timing sensitivity and priority. Example mixed media environments may include Internet of Things (IoT) environments where the timed communication of data by one or more of the "things" may be more important than that of other "things" (e.g., data communicated by a fire alarm, a security alarm, etc. may be more time-critical than that communicated by a network-connected refrigerator). Other mixed media environments may include vehicle networks that support climate control, infotainment, body electronics, and/or driver assistance.

As further context, in some wireless networks (e.g., IEEE 802.11 networks) a communication channel of a shared wireless communication medium (e.g., a particular carrier frequency) is used to wirelessly transmit data between devices. In these or other implementations, the transmission protocol may be contention based in that in that the devices may "contend" for use of the particular channel. Further, once a device obtains use of the particular channel, typically only that device transmits over the particular channel and the other devices contending for use of the particular channel have to wait until that device is done transmitting before being able to transmit over the particular channel.

Additionally, data that is scheduled to be transmitted is typically organized into clusters of data that may be referred to as data frames (or simply "frames"). Depending on the communication protocol (e.g., modulation scheme, bits per symbol, symbol rate, etc.) and the amount of data included in a particular frame, it may take a particular amount of time to transmit all of the data of the particular frame. In these or other implementations, a particular time period that corresponds to the particular amount of time (including a buffer in some instances) may be allocated for the transmission of the particular frame by a corresponding device. Further, transmission of another frame after the particular frame typically begins after transmission of the particular frame has finished (e.g., after the allocated time period has passed). However, as indicated above, there may be some instances in which it may be advantageous to begin transmission of another frame before transmission of the particular frame has finished.

Therefore, as indicated above, according to one or more implementations of the present disclosure, systems and methods may relate to the termination of wireless transmission of a frame prior to all of the data of the frame being transmitted. In the present disclosure, reference to transmission of a frame or data of a frame may include the transmission of a wireless signal (e.g., an electromagnetic wave) that has the data of the frame modulated thereon such that the wireless signal is configured to wirelessly carry the data of the frame. Further, reference to termination of a frame may refer to termination of transmission of the frame. In addition, termination of transmission of a frame or the data of the frame and reference thereof may include the termination of the wireless signal that is configured to carry the data of the frame.

As also indicated above, implementations described herein may also include the transmission of a termination signal in which the termination signal indicates that transmission of the frame has been terminated. The termination signal may be such that other devices within the wireless network (e.g., the device to which the frame is intended and/or other devices that may use a same channel of a shared wireless communication medium) may identify the termination signal. In these or other implementations as described in further detail below, one or more of the other devices may determine that the frame has been prematurely terminated in response to identifying the termination signal. Additionally or alternatively, the other devices may prepare for the communication of another frame over the channel in response to determining that transmission of the frame has been terminated.

In contrast, without the transmission and identification of the termination signal, the receiving device of the terminated frame may not know if the frame was intentionally terminated prematurely and may continue to expect to receive the remainder of the data of the terminated frame rather than prepare for the reception of another frame. Additionally or alternatively, one or more other devices that are connected to the wireless network may be configured to avoid performing one or more transmitting and/or receiving operations during an allocated time period for transmission of the terminated frame. As such, without transmission and identification of the termination signal, the one or more other devices may not be in a state that is ready to transmit or receive frames until after the allocated time period has passed even though premature termination of the frame may open the channel for wireless communications prior to the termination of the allocated time frame.

The transmission of the termination signal to indicate termination of the frame may thus prepare the wireless network (e.g., the devices communicating via the wireless network) for communication of another frame during a time period that would otherwise be reserved for communication of the terminated frame. As such, the transmission of the termination signal may allow for transmitting at least a portion of a higher priority frame over a particular channel before transmission of all the data of a of a lower priority frame transmitted over the particular channel has finished. As indicated above, such allowance may help facilitate the wireless transmission of time-sensitive data such as that communicated as part of time-sensitive networking.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1A illustrates an example environment 100 within which wireless communication of a data frame may be terminated prematurely. The environment 100 may be configured according to one or more implementations of the present disclosure. The environment 100 may include one or more of many different types of environments. For example, the environment 100 may include, individually or any suitable combination thereof, a home environment, an IoT environment, a vehicle environment, or any other suitable environment that may include or incorporate a wireless network to facilitate the communication of data between devices. In the present example, the environment 100 may include a first device 102, a second device 104, a third device 106, and a fourth device 108 all configured to wirelessly communicate with each other via a wireless network 110. However, the elements listed and operations thereof are not meant to be limiting, but merely used to provide an example implementation of the present disclosure.

The wireless network 110 may include any suitable network that may be established to wirelessly communicate data between devices. For example, the network 110 may include a wireless local area network (LAN) and/or a wireless telecommunications network. For instance, the network 110 may include or be configured to include a cellular network (e.g., 4G, 5G, LTE, network), a wireless fidelity network (e.g., 802.11 WI-FI® network), a BLUETOOTH® network, a Z-WAVE® network, an INSTEON® network, an ENOCEAN® network, a ZIGBEE® network, a HOMEPLUG® network, etc. In some implementations, the wireless network 110 may be communicatively coupled to or included in another network such as a wide area network (WAN) (e.g., the Internet) and/or any other suitable interconnected data paths across which multiple devices may communicate.

In some implementations, the wireless network 110 may be a contention-based network. As indicated above, a contention-based wireless network may include multiple devices that "contend" for use of a communication channel of a shared wireless communication medium (e.g., use of a particular transmission frequency) rather than sticking to a strictly scheduled basis for use of the channel. Further, once a device has gained use of the communication channel and begins transmitting a data frame over a particular channel of the wireless network, the transmission of a subsequent frame is delayed until after the transmission of the frame currently being transmitted has finished.

In these or other implementations, the wireless network 110 may also be configured to facilitate Time-Sensitive Networking ("TSN") in which data that is being transmitted over networks, including wireless networks, is time-sensitive in that when the time-sensitive data is transmitted may be important. For example, the wireless network 110 may be configured such that certain periods of time are reserved for communication of time-sensitive data. Other periods of time may be reserved for typical communication of data that may be lower priority or less time sensitive "non-time sensitive data". The reserved time periods may be referred to as "protected time slots" and the other time periods may be referred to as "unprotected time slots." However, as explained further below, the contention-based nature of gaining access to the channel for frame transmission may cause non-time sensitive data to impinge on protected time slots.

As explained in detail below, in some implementations, the communication of frames within the wireless network 110 may be such that the transmission of a frame may be terminated prematurely to free up the corresponding channel for communication of another frame with a higher transmission priority. For example, in some instances, the transmission of a frame of data that may not be time sensitive ("lower priority frame") may impinge on a protected time slot such that it may be advantageous to prematurely terminate the transmission of the lower priority frame to allow for the transmission of a frame of time sensitive data ("higher priority frame") within the protected time slot.

Figure 1B:
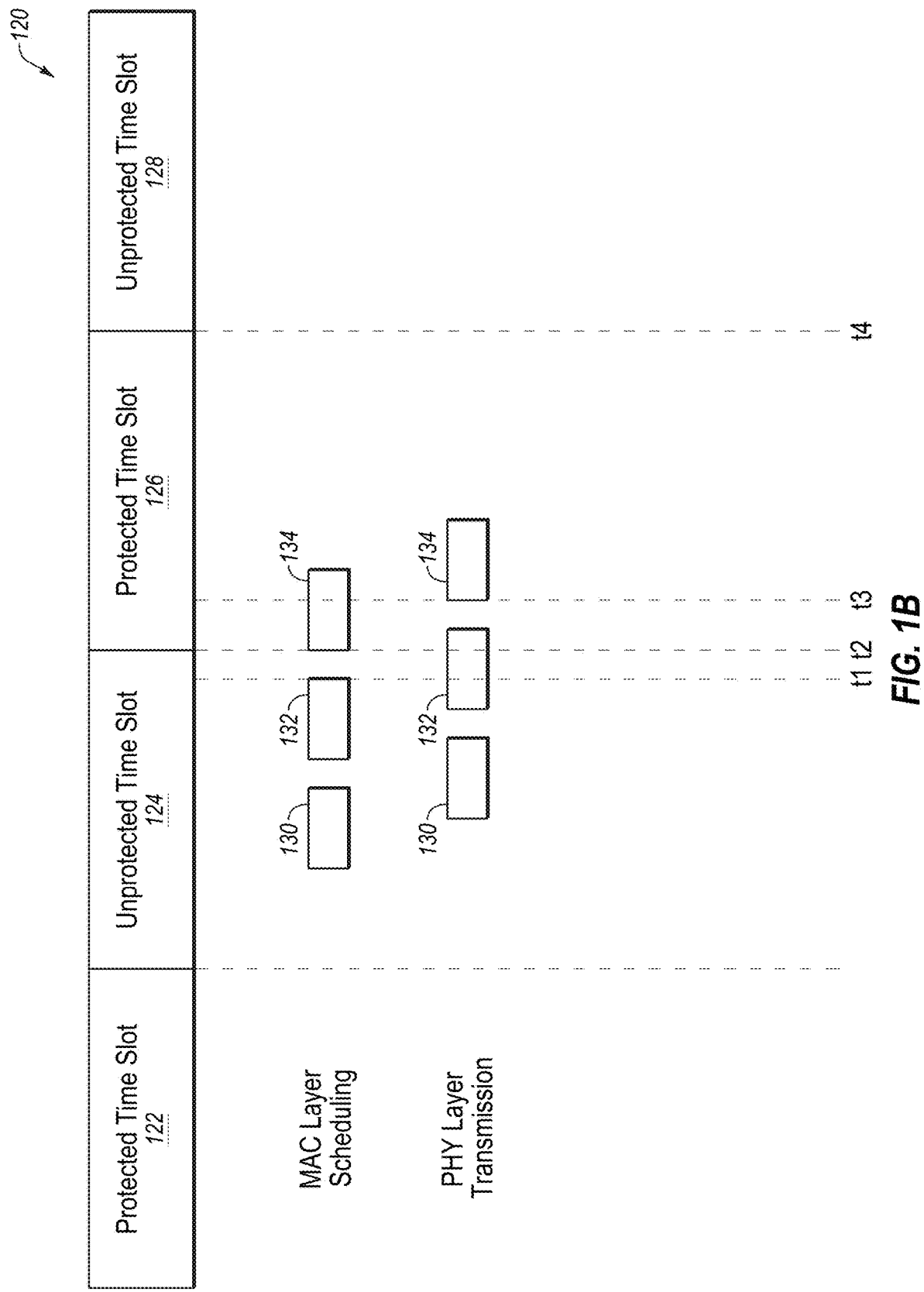
FIG. 1B illustrates an example instance in which transmission of a lower priority frame may impinge on a protected time slot of a time period.

FIG. 1B illustrates an example instance in which transmission of a lower priority frame 132 may impinge on a protected time slot 126 of a time period 120 such that early termination of the lower priority frame 132 may be advantageous. The situation of FIG. 1B is merely to illustrate an example situation in which implementation of the concepts described in the present disclosure may be used and is not meant to be limiting.

As illustrated in FIG. 1B, the time period 120 may be divided into different time slots that may include protected time slots 122 and 126 and unprotected time slots 124 and 128. Although the protected time slots 122 and 126 and the unprotected time slots 124 and 128 are illustrated as being of the same duration, the durations of the protected time slots 122 and 126 may differ from those of the unprotected time slots 124 and 128 in some implementations. In these or other implementations, the durations of the protected time slots 122 and 126 may differ from each other. Additionally or alternatively, the durations of the unprotected time slots 124 and 128 may also differ from each other.

As illustrated in FIG. 1B, lower priority frames 130 and may be scheduled for transmission in the unprotected time slot 124 during Media Access Control (MAC) layer scheduling of data transmission. In addition, a higher priority (e.g., time sensitive) frame 134 may be scheduled for transmission in the protected time slot 126 during the MAC layer scheduling. As illustrated in FIG. 1B, the lower priority frame 132 may be scheduled to finish transmission at time "t1" during the unprotected time slot 122. Further, the higher priority frame 134 may be scheduled to begin transmission at time "t2" when the unprotected time slot 124 ends and the protected time slot 126 begins. In some implementations, and as illustrated in FIG. 1B, an amount of time between "t1" and "t2" may be allocated as a guard-band between transmissions to help ensure that the operations statuses of any applicable devices of the wireless network 110 have changed, as may be needed, to account for a change from the transmission of the lower priority frame 132 to the higher priority frame 134.

As also illustrated in FIG. 1B, in some instances, the MAC layer scheduling of frame transmission may not correspond to the actual timing of transmission of the frames at the Physical (PHY) layer. For example, the lower priority frame 130 may begin transmission later than scheduled, which may cause the lower priority frame 132 to begin transmission later than scheduled. In some instances, the timing discrepancies may be due to the contention on the shared channel in which it may take time for the devices that are allocated to transmit the frames to actually gain access to the channel and begin communication. As illustrated in FIG. 1B, the discrepancies may be such that the lower priority frame 132 may not end transmission until after time "t2" and such that the higher priority frame 134 may not begin transmission until a time "t3." In instances in which transmission of the higher priority frame 134 is time sensitive, such a situation may create problems. Therefore, as described in further detail below, according to one or more implementations of the present disclosure, the transmission of the lower priority frame 132 may be terminated prematurely (e.g., at time "t1") such that transmission of the higher priority frame 134 may begin at time "t2".

In these or other implementations, the remainder of the data of the lower priority frame 132 that was not transmitted before the termination of the lower priority frame 132 may be transmitted after the higher priority frame 134 has finished being transmitted. For example, in some implementations, the remainder of the data of the lower priority frame 132 may begin to be transmitted at time "t4" when the protected time slot 126 ends and the unprotected time slot 128 begins. In these or other implementations, the remainder of the data of the lower priority frame may be transmitted as part of a new frame.

As indicated above, modifications, additions, or omissions may be made to FIG. 1B without departing from the scope of the present disclosure. For example, in some instances, the transmission of the lower priority frame 132 may be terminated at or before time "t2" even if there is no higher priority frame scheduled for transmission (e.g., the higher priority frame 134) because transmission of the lower priority frame 132 would still impinge on the protected time slot 126. Additionally or alternatively, transmission of the lower priority frame 132 may be terminated prematurely even if it would not impinge on the protected time slot 126 if it would still impinge on the transmission time of the higher priority frame 134. Further, in some implementations, the time period 120 may not be divided into protected time slots and unprotected time slots. In addition, the representations of the frames and times are only meant to indicate the timing of when data of the frames is being transmitted. The representation is not meant to illustrate the specific wireless signal used to carry the corresponding data of the frames.

Returning to FIG. 1A, each of the first device 102, the second device 104, the third device 106, and the fourth device 108 (referred to collectively as "the devices") may include any suitable system or device configured to perform wireless communications. For example, one or more of first device 102, the second device 104, the third device 106, and the fourth device 108 may operate as an access point of the wireless network 110. An access point of the wireless network 110 may include any suitable system or device that may establish the wireless network 110 and/or communicatively couple the wireless network 110 with another network. By way of the example, the access point(s) may include a gateway, a repeater, a mesh node, and/or other suitable access point that wirelessly couples the other devices of the wireless network 110 to each other and/or to another network (e.g., the Internet and/or a core network via a bridge, a backhaul link, a base station, and/or other suitable devices or connections).

Additionally or alternatively, one or more of first device 102, the second device 104, the third device 106, and the fourth device 108 may operate as a node of the wireless network 110. For example, a node of the wireless network 110 may generally include any device that has the capability to wirelessly connect to an access point of the wireless network 110 according to any suitable wireless standard of the wireless network 110 (e.g., the 802.11 standards). By way of example, the node(s) may include a desktop computer, a laptop computer, a tablet computer, a mobile phone, a smartphone, a personal digital assistant (PDA), a smart television, or any other suitable device. In some implementations, each of the first device 102, the second device 104, the third device 106, and the fourth device 108 may include or be included in a computing system such as the computing system 202 described with respect to FIG. 2.

The first device 102 may include a first transceiver system 112a, the second device 104 may include a second transceiver system 112b, the third device 106 may include a third transceiver system 112c, and the fourth device 108 may include a fourth transceiver system 112d. The transceiver systems 112 may include any suitable, system, apparatus, or device that may be configured to effectuate the transmission and reception of wireless signals.

For example, one or more of the transceiver systems 112 may include an antenna configured to receive wireless signals (e.g., modulated electromagnetic waves) and configured to convert the received wireless signals into corresponding analog electrical signals (referred to as "received analog signals"). The one or more transceiver systems 112 may include one or more analog components configured to perform any applicable analog operations on the received analog signals. In these or other implementations, the one or more transceiver systems 112 may include an analog-to-digital converter (ADC) configured to convert the received analog signals into corresponding digital signals (referred to as "received digital signals"). The one or more transceiver systems 112 may include receiver digital circuitry configured to process the received digital signals and corresponding data of the received digital signals. Additionally or alternatively, the receiver digital circuitry may be configured to direct operations related to the reception and processing of wireless signals. One or more elements of the receiver digital circuitry may be hardware that is custom designed to perform one or more of the receiver operations. Additionally or alternatively, one or more of the elements of the receiver digital circuitry may include a computing system that is programmed to perform certain operations using computer-executable instructions. For example, one or more elements of a computing system 200 of FIG. 2 may be included in or part of the receiver digital circuitry in some implementations.

In these or other implementations, one or more of the transceiver systems 112 may include transmitter digital circuitry configured to generate digital signals for wireless transmission referred to as "transmission digital signals." Additionally or alternatively, the transmitter digital circuitry may be configured to direct operations related to the transmission of wireless signals. Like the receiver digital circuitry, one or more elements of the transmitter digital circuitry may be hardware that is custom designed to perform one or more of the transmitter operations. Additionally or alternatively, one or more of the elements of the transmitter digital circuitry may include a computing system that is programmed to perform certain operations using computer-executable instructions. For example, one or more elements of a computing system 200 of FIG. 2 may be included in or part of the transmitter digital circuitry in some implementations. Further, in some implementations, the receiver digital circuitry and the transmitter digital circuitry may be completely separate. Additionally or alternatively, the receiver digital circuitry and the transmitter digital circuitry may include one or more of the same hardware components. For example, in some implementations, the same computing system may be used as part of the transmitter digital circuitry and the receiver digital circuitry.

In some implementations, the one or more transceiver systems 112 may include a digital-to-analog converter (DAC) configured to convert the transmission digital signals into corresponding transmission analog signals. The transmission analog signals may be directed toward an antenna (e.g., the same antenna used to receive wireless signals or a different antenna), which may convert the transmission analog signals into wireless signals in the form of electromagnetic waves. In some implementations the one or more transceiver systems 112 may include one or more analog components configured to perform any applicable analog operations on the transmission analog signals prior to directing the transmission analog signals to the antenna. Further, in the present disclosure reference to "hardware" performing operations may include one or more of the elements of the devices (e.g., of the transceiver systems 112 performing operations). In addition, reference to "hardware" performing operations may include operations that are performed as directed by software in the form of computer-executable instructions.

As indicated above, the transceiver systems 112 may be configured to transmit and receive data that is bundled together as frames. Further, as indicated above, the frames may be communicated via wireless signals that have the data of the frames modulated thereon. In these or other implementations, the wireless signals may be modulated to carry a certain amount of data (e.g., a certain number of bits) at any one time. In some modulations, the signal is subdivided into smaller entities called symbols. Symbols have fixed duration and each carry a number of bits determined by the modulation. Therefore, the data of the frames may be divided into portions that are transmitted via corresponding symbols. Further, the number symbols used and amount of time to send all of the data of the frames may also accordingly depend on the amount of data in the frame, the number of bits per symbol, and the symbol rate. In the present disclosure, burst of electromagnetic energy in the form of the particular wireless signal that transmits a particular frame of data may be referred to as a "wireless signal packet" or "signal packet." For example, the transmission of a first frame of data may be via a first burst of a modulated electromagnetic wave that may be considered a first signal packet. Similarly, the transmission of a second frame of data may be via a separate second burst of a modulated electromagnetic wave that may be considered a second signal packet.

Figure 1C:
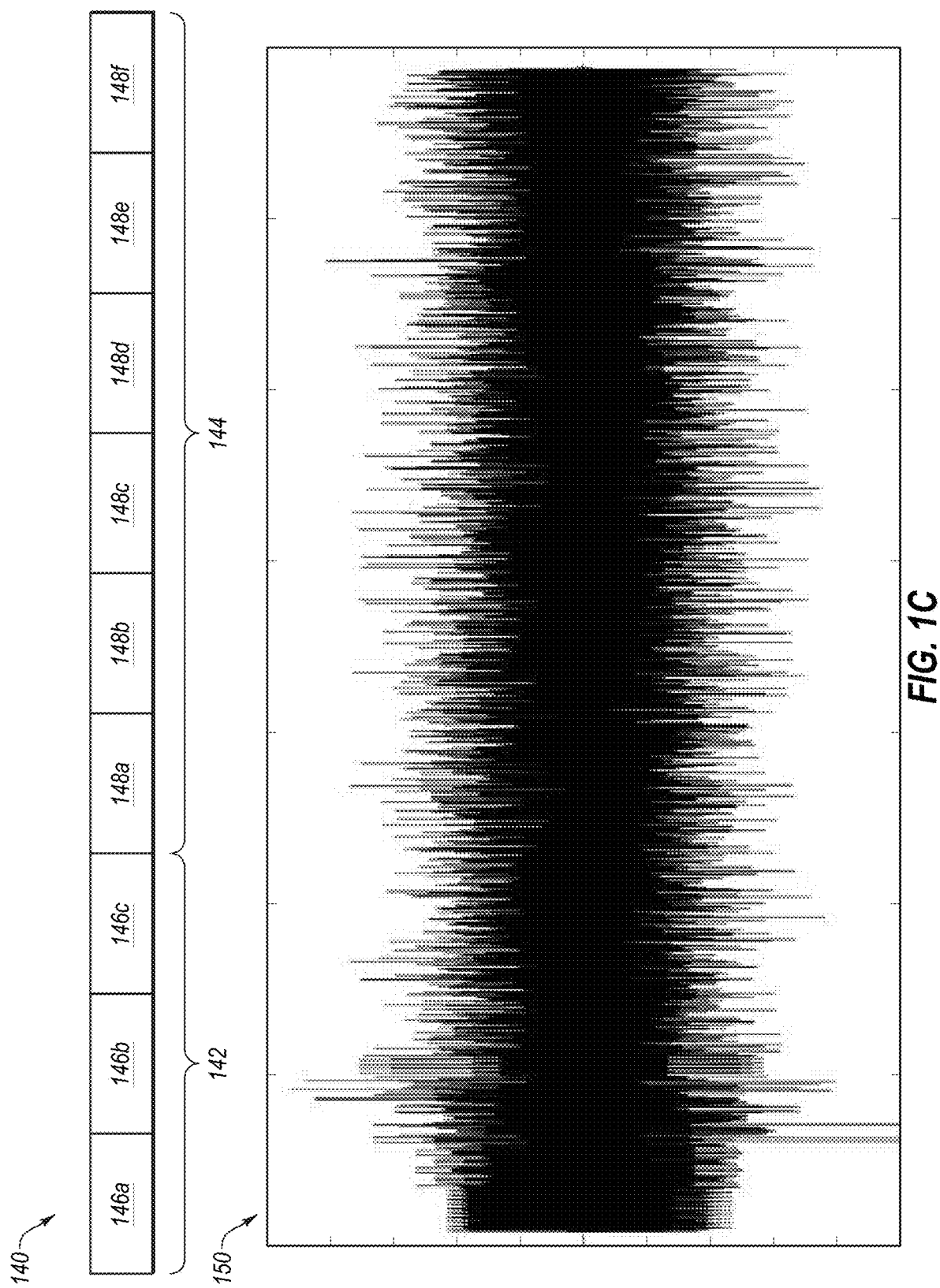
FIG. 1C illustrates an example of transmission of a frame.

FIG. 1C illustrates an example of transmission of a frame 140 according to one or more implementations of the present disclosure. The frame 140 may include a header portion 142 and a payload portion 144. The header portion 142 may include information that provides information about the way the data of the frame 140 is encoded into the signal. For example, the header portion may include information that indicates from which device the frame 140 was transmitted and to which device the frame 140 is intended for reception. Further, the header portion 142 may include information indicating the overall length (e.g., number of symbols) of the frame 140, including the length (e.g., number of symbols) of the payload portion 144. For example, the header portion 142 may indicate the amount of data (e.g., number of bits) that may be included in the payload portion and based on the number of bits per symbol and amount of data, the number of symbols may be determined. Similarly, the header portion 142 may indicate an amount of time for transmission of the frame 140. For example, the amount of time may be determined based on the number of symbols and the symbol rate. The payload portion 144 may include the data that is scheduled to be transmitted.

The example of the frame 140 also illustrates dividing the frame 140 according to symbols 146. In particular, the header portion 142 is illustrated as being communicated via a first header symbol 146*a*, a second header symbol 146*b*, and a third header symbol 146*c*. Additionally, the payload portion 144 is illustrated as being communicated via a first payload symbol 148*a*, a second payload symbol 148*b*, a third payload symbol 148*c*, a fifth payload symbol 148*d*, and a sixth payload symbol 148*f* The illustration of the frame 140 and dividing of the data of the frame 140 according to symbols is merely for illustrative purposes and is not limiting with respect to other groupings of data of the frame 140. For example, the structure and dividing of the data of the frame 140 at the MAC layer (e.g., the digital signal processing layer with operations that may be performed by digital circuitry such as the transmission digital circuitry) may be different from what is illustrated in FIG. 1C. For instance, the header data of the header portion 142 may be divided into header sub-portions at the MAC layer that do not necessarily coincide with the divisions of the data according to symbols as illustrated. For example, the data of a particular header sub-portion may be transmitted over multiple symbols. Additionally or alternatively, at least some of the data of the particular header sub-portion and at least some of the data of another header sub-portion may be transmitted over a same symbol. The structure and the dividing of the payload data at the MAC layer may similarly differ from that illustrated in FIG. 1C. Further, the number of symbols illustrated in FIG. 1C is merely to provide an illustration of the concepts and is not meant to be limiting.

FIG. 1C also illustrates an example wireless signal packet 150 ("signal packet 150") that may be modulated with the data of a particular frame (e.g., the frame 140). The modulated signal packet 150 may be transmitted such that the signal packet 150 may "carry" the data of the particular frame for wireless transmission of the particular frame. As with the frame 140, the illustration of the signal packet 150 is meant to help convey concepts and the actual characteristics of any given signal packet may vary from that illustrated. Further, the number of symbols included in the illustrated signal packet 150 does not necessarily coincide with the number of symbols illustrated with respect to the frame 140. However, in instances in which the signal packet 150 corresponds to the frame 140, the signal packet 150 would coincide with the frame 140 in any applicable manner, such coincidence is merely not illustrated.

As also discussed in further detail below, in some instances, transmission of a particular frame may be prematurely terminated. Additionally or alternatively, a termination signal may be transmitted to indicate the premature transmission of termination. The termination signal may be transmitted instead of continuing transmission of the corresponding signal packet carrying the data of the frame. As such, transmission of the termination signal may replace transmission of the remaining data of the particular frame that has not yet been transmitted. For example, a transmitting device that was transmitting the particular frame may transmit the termination signal instead of continuing to transmit symbols of the corresponding signal packet that may have the data of the particular frame modulated thereon. However, the duration of transmission of the termination signal may be less than the amount of time that it would take to transmit the remaining data of the particular frame. As such, the wireless channel used for transmission of the particular frame may be available for transmission of the higher priority frame sooner than it otherwise would be.

The termination signal may be configured to convey that premature termination of transmission of the particular frame has occurred. For example, in some implementations, the termination signal may be configured for low-level detection and recognition. In these or other implementations, the termination signal may include one or more detection properties that may be detected with relative ease and a relatively low amount of processing to help facilitate the determination by a receiving device (e.g., the first device 102, the second device 104, the third device 106, and/or the fourth device 108) that transmission of the particular frame was purposefully terminated prematurely.

For instance, in some implementations, the termination signal may have a particular self-contained detection property. In the present disclosure, a "self-contained" detection property may include a simple physical characteristic of the electromagnetic wave that makes up the termination signal. For example, the self-contained detection property may include a repeating amplitude pattern of the termination signal. Additionally or alternatively, the self-contained detection property may include a repeating frequency or phase pattern of the termination signal. In these or other implementations, the self-contained detection property may be a particular auto-correlation property or cross-correlation property. As such, in some implementations, the termination signal may include a signal sequence that may have a particular detection property. For instance, the termination signal may include a particular auto-correlation sequence or a particular cross-correlation sequence.

In these or other implementations, different configurations of the termination signal may indicate other information associated with the termination of transmission in addition to indication of premature termination. For example, a first termination signal may have a first detection property that may indicate that acknowledgement of reception of the termination signal is requested. Similarly, and a second termination signal may have a second detection property that may indicate that acknowledgement of reception of the termination signal is not requested.

Additionally or alternatively, the termination signal may be a modulated wireless signal that includes one or more symbols in which the data of the symbols indicates that premature termination of transmission of the particular frame has occurred. In these or other implementations, the data of the symbols may include additional information related to the termination of transmission of the particular data frame.

Figure 1D:
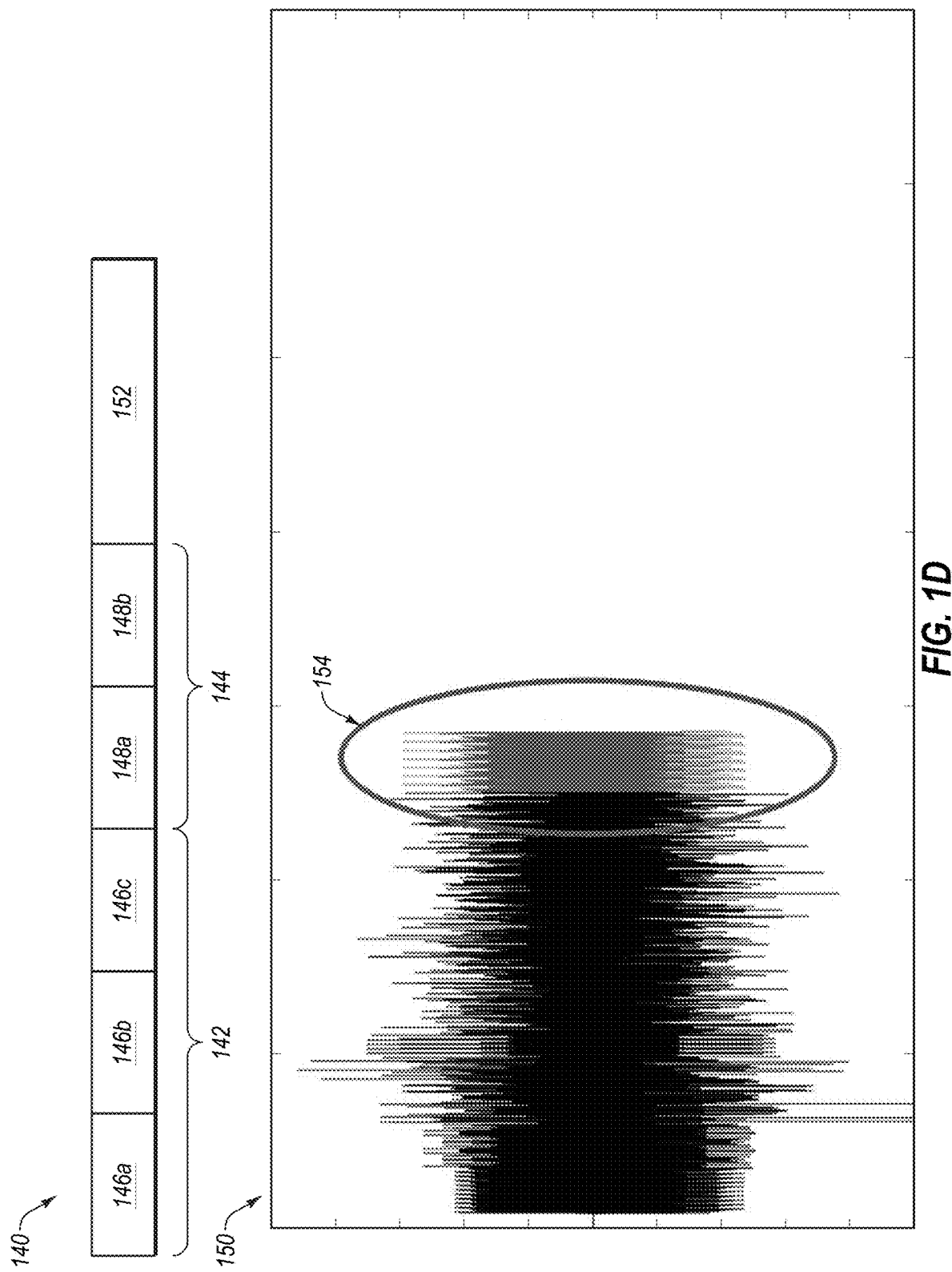
FIG. 1D illustrates an example representation of the effect of premature termination of transmission of the frame of FIG. 1C.

FIG. 1D illustrates an example representation of the effect of premature termination of transmission of the frame 140 of FIG. 1C. As illustrated in FIG. 1D, the last symbol of the frame 140 that may be transmitted before termination may be the second payload symbol 148*b*. As also illustrated in FIG. 1D, a termination signal 152 may be transmitted rather than the remaining payload symbols 148c, 148d, 148e, and 148f. As also indicated by a comparison between FIGS. 1C and 1D, the duration of the termination signal 152 may be less than the duration of unsent payload symbols 148c, 148d, 148e, and 148f. As such, the corresponding wireless channel may be opened for use prior than it otherwise would be. The representation of transmission of the termination signal 150 instead of the payload symbols 148c, 148d, 148e, and 148f is merely to help illustrate the replacement of transmission of data of the frame 140 with the transmission of the termination signal 152 and should not be construed as being completely accurate from a technical standpoint.

FIG. 1D also illustrates an example representation of premature termination of a frame at the signal packet level. In particular, FIG. 1D illustrates premature termination of the signal packet 150 of FIG. 1C. As illustrated in FIG. 1D, transmission of the signal packet 150 may be terminated prematurely and a termination signal 154 may be transmitted instead. As such, all of the data that would otherwise be carried by the signal packet 150 may not be transmitted and the transmission of the unsent data may be replaced by the termination signal 154. As also indicated by a comparison between FIGS. 1C and 1D, the duration of the termination signal 154 may be less than the duration of the unsent portion of the signal packet 150. As such, the corresponding wireless channel may be opened for use prior than it otherwise would be. Additionally, the illustrated termination signal 154 has a repeating sequence of a particular amplitude pattern that may be used to identify the termination signal 154.

Returning to FIG. 1A, in some implementations, the transceiver systems 112a, 112b, 112c, and 112d, may each include a termination signal detector ("T.S. detector") 114a, 114b, 114c, and 114d, respectively. The T.S. detectors 114 may be configured to monitor received signals to detect whether reception of a termination signal by the corresponding transceiver systems 114 has occurred. The T.S. detectors 114 may be implemented in hardware (e.g., analog and/or digital circuitry), software (e.g., computer-executable instructions stored on memory), or any suitable combination thereof. Further, the T.S. detectors 114 may be configured to perform the monitoring and detection in the analog domain, the digital domain, or any suitable combination thereof. By way of example, in some implementations one or more components of the T.S. detectors 114 may be part of receiver digital circuitry and/or the receiver analog components of the corresponding transceiver system 112.

Figure 1E:
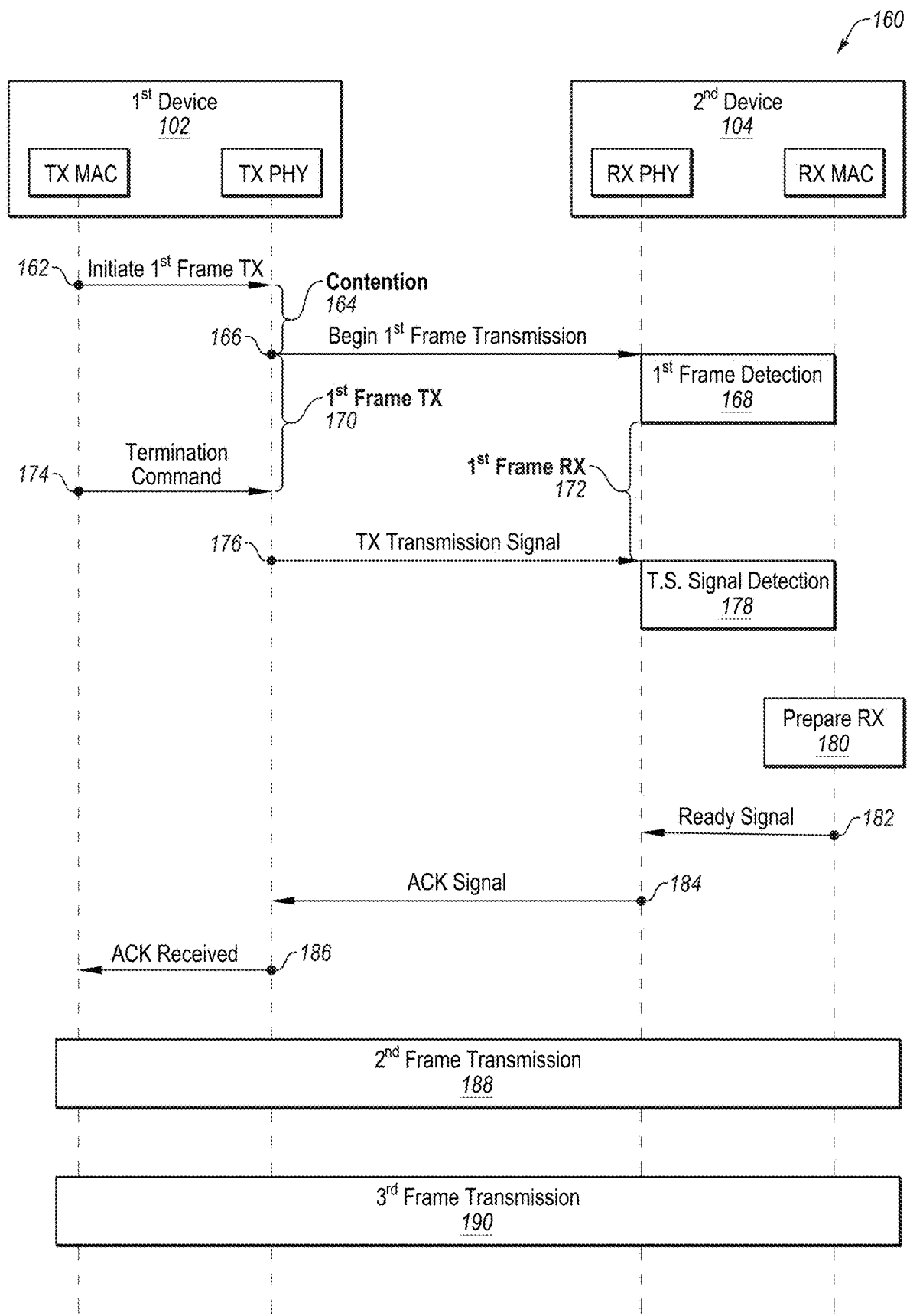
FIG. 1E illustrates an example sequence of operations that may be performed with respect to a first device prematurely terminating wireless transmission of a data frame that is received by a second device.

FIG. 1E illustrates an example sequence of operations 160 ("sequence 160") that may be performed with respect to the first device 102 prematurely terminating wireless transmission of a data frame that is received by the second device 104, according to one or more implementations of the present disclosure. The operations of the sequence 160 are described at the transmitter MAC and PHY layers of the first device 102 and the receiver MAC and PHY layers of the second device 104. The transmitter MAC layer ("Tx MAC") of the first device 102 may include any suitable component of the transceiver system 112a that may be configured to perform the described transmitter MAC layer operations. For example, the operations associated with the transmitter MAC layer may include encryption, encapsulation of the payload, frame aggregation, packet prioritization, etc. that may be performed by one or more components of the transmitter digital circuitry. The transmitter PHY layer ("Tx PHY") of the first device 102 may include any suitable component of the transceiver system 112a that may be configured to perform the described transmitter PHY layer operations. For example, the operations associated with the transmitter PHY layer may include scrambling, encoding, modulation, etc. that may be performed by one or more components of the transmitter digital circuitry. The receiver MAC layer ("Rx MAC") of the second device 104 may include any suitable component of the transceiver system 112b that may be configured to perform the described receiver MAC layer operations. For example, the operations associated with the receiver MAC layer may include decryption, decapsulation of the payload, checking frame integrity, acknowledging reception of frames, etc. that may be performed by one or more components of the receiver digital circuitry. The receiver PHY layer ("Rx PHY") of the second device 104 may include any suitable component of the transceiver system 112b that may be configured to perform the described receiver PHY layer operations. For example, the operations associated with the receiver PHY layer may include channel equalization, demodulation, decoding, descrambling, etc. that may be performed by one or more components of the receiver digital circuitry.

At operation 162, the Tx MAC may initiate wireless transmission of a first frame of data by the Tx PHY. For example, the Tx MAC may send the data of the first frame to the Tx PHY for modulation onto a corresponding first signal packet. For example, the Tx MAC may send the header portion and the payload portion to the Tx PHY. In these or other implementations, the data of the first frame may be organized according to order of transmission by the Tx PHY. The data of first frame may be designated for wireless transmission over a particular wireless channel. Further, the first frame may be considered a lower priority frame in some instances. For example, in some instances, the data of the first frame may be non-time sensitive data scheduled for transmission during an unprotected time slot, such as the lower priority frame 132 of FIG. 1B.

At operation 164, in response to initiation of transmission of the first frame as received from the Tx MAC, the Tx PHY may contend for use of the particular wireless channel during a contention period. At operation 166, after obtaining the right to use the particular wireless channel, the Tx PHY may begin wireless transmission of the first frame over the particular wireless channel. For example, the Tx PHY may modulate the data of the first frame onto a first signal packet such that the first signal packet carries the data of the first frame. The Tx PHY may also begin transmitting the first signal packet. The first signal packet may be a wireless signal transmitted at the frequency of the particular wireless channel and that has the data of the first frame modulated thereon.

At operation 168, the Rx PHY may detect the first signal packet, and accordingly may detect transmission of the first frame. For example, the first signal packet may include a particular frame initiation detection sequence (e.g., a particular autocorrelation or cross-correlation sequence) that may indicate that transmission of the first frame has begun. In these or other implementations, the Rx PHY may detect the particular frame initiation detection sequence and may begin operations for reception of the first frame (e.g., via the first signal packet).

In these or other implementations, the Rx PHY may receive one or more symbols of the first signal packet that may include header data of the header portion of the first frame. The header data may indicate that the first signal frame (e.g., via the first signal packet) is designated for reception by the second device 104. Additionally or alternatively, the header data may indicate a length of the first frame. The Rx PHY may communicate the received signal and/or data (e.g., the received header data) to the Rx MAC for processing and interpretation. For example, the Rx MAC may receive the header data and, based on the header data, may determine that the first frame is intended for reception by the second device 104. Additionally or alternatively, the Rx MAC may determine a length of the first frame and an expected transmission time of the first frame based on the header data. In response to detecting the first frame and determining that the first frame is intended for the second device 104, the second device 104 (e.g., via the Rx PHY and the Rx MAC) may begin actively processing the data of the first frame as received via the first signal packet.

Although not expressly illustrated in FIG. 1E, the third device 106 and/or the fourth device 108 may also begin receiving the first signal packet and may also detect the particular frame initiation detection sequence. Additionally or alternatively, the third device 106 and/or the fourth device 108 may receive and process the header data. In these or other implementations, the third device 106 and/or the fourth device 108 may not process any more of the data of the first frame, as received via the first signal packet, in response to the header data indicating that the first frame is intended for the second device 104 and not the third device 106 or the fourth device 108.

At operation 170 the first device 102 may continue transmitting the first frame. At operation 172, the second device 104 may continue receiving the first frame.

At operation 174, the Tx MAC may communicate a termination command to the Tx PHY. The termination command may direct termination of the wireless transmission of the first data frame via the first signal packet. In addition, the Tx MAC may communicate the termination command prior to all of the data of the first data frame being transmitted via the first signal packet. In other words, the Tx MAC may communicate the termination command prior to complete transmission of the first signal packet.

In some implementations, the Tx MAC may communicate the termination command in response to a determination that a time of transmission of at least a portion of the data of the first frame is within a protected wireless communication time slot. As indicated above, in some instances, the determination that the time of transmission may be within a protected time slot may be based on the expected time of transmission of the first frame (e.g., as indicated by the header data) and the time that the first frame began being transmitted after the contention period of operation 164. Additionally or alternatively, the Tx MAC may communicate the termination command in response to the first frame having a lower transmission priority than a second frame that is scheduled for transmission over the particular wireless channel. By way of example, the lower priority frame 132 of FIG. 1B may be an example of the first frame. Additionally or alternatively, the higher priority frame 134 of FIG. 1B may be an example of the second frame.

In some implementations, the first device 102 may determine that transmission of the particular frame is to end prematurely and may accordingly initiate the termination command. Additionally or alternatively, another device may make the determination and communicate such to the first device 102. In these or other implementations, the Tx MAC may communicate the termination command in response to the first device 102 receiving an instruction from the other device. In these or other implementations, the determination may be made at the Tx MAC of the first device 102 or at the MAC layer of one or more of any other applicable device.

In these or other implementations, the Tx PHY may transmit a termination signal in response to receiving the termination command. The termination signal may be transmitted instead of the rest of the first signal packet. As such, the termination signal may be transmitted instead of the data of the first frame, such as described with respect to FIG. 1D. The termination signal may include a particular detection property that identifies the termination signal, such as described above. The termination signal may indicate that transmission of the first frame terminated prior to completion of transmission of all of the data of the particular frame. As indicated above, transmission of the termination signal may help the other devices of the environment 100 to prepare for the wireless transmission of another frame (e.g., the higher priority data frame) via the wireless network 110.

For instance, during the transmission time frame of the first frame (e.g., as indicated by the header data of the first frame), the second device 104 may be configured to monitor the wireless signals received at the second device 104 to determine whether a received signal is a termination signal. For example, while receiving the first signal packet associated with the first frame and while processing the corresponding data, the second device 104 (e.g., via the T.S. detector 114b) may be configured to monitor the received wireless signal (e.g., the first signal packet or the termination signal) for a particular detection property that indicates reception of a termination signal.

In some implementations, the second device 104 may be configured to monitor for the termination signal in parallel with the processing of the first signal packet and corresponding data. For example, the transceiver system 112b may be configured to direct received wireless signals to the T.S. detector 114b in parallel with directing the received wireless signals to other receiver components that may perform "regular" processing of received signals. The parallel splitting of the received signals may be before or after digital conversion of the received signals depending on the particular implementation.

Reference to directing "received wireless signals" may include the directing of signals that are generated as part of transformation of the received wireless signals. For example, as indicated above, analog electrical signals and digital signals may be generated based on received wireless signals. Reference to the directing of "received wireless signals" may accordingly include the directing of the generated analog electrical signals and/or the generated digital signals.

By way of example, at operation 178, the Rx PHY may receive the termination signal transmitted at operation 176. Further, the second device 104 (e.g., via the T.S. detector 114b) may identify the particular detection property of the termination signal. In response to identifying the particular detection property in the received wireless signal, the second device 104 may recognize that the termination signal has been received instead of the first signal packet. In response to recognizing that the termination signal has been received, the second device 104 may be configured to determine that transmission of the first signal packet has been terminated prior to complete transmission of the first signal packet. The second device 104 may accordingly determine that transmission of the first frame (e.g., via transmission of the first signal packet) has been terminated prior to all of the data of the first frame being transmitted. Conversely, in instances in which the received signal is the first signal packet (e.g., during the operation 172), the second device 104 may continue normal processing of the data of the first frame as carried by the first signal packet. In some implementations, the detection and identification of the termination signal by the T.S. detector 114b may be at the Rx PHY and may be reported to the Rx MAC via communication of information to one or more Rx MAC layer components.

At operation 180, in response to reception and recognition of the termination signal, the second device 104 (e.g., via the Rx MAC) may prepare for possible reception of another frame (e.g., the second frame) rather than continue to wait for reception of the remaining data of the first frame. For example, the Rx MAC may interrupt processing of the data of the first frame. Additionally or alternatively, the Rx MAC may reset a receive state machine of the second device such that the second device may be ready to receive another frame. In contrast, if the second device 104 were to continue to wait for reception of the remaining data of the first frame, the second device 104 may not be in a state to be able to receive and process the other frame even if the other frame were addressed for reception at the second device 104.

In some implementations, at operation 182, the Rx MAC may communicate a ready signal to the Rx PHY to indicate that the second device 104 is ready to receive another frame. Additionally or alternatively, the second device 104 may be configured to acknowledge receipt of the termination signal in response to identifying the termination signal. For example, at operation 184 the second device 104 may wirelessly transmit an acknowledgement that may be received at the Tx PHY of the first device 102 and communicated to the Tx MAC at operation 186.

Additionally or alternatively, the second device 104 may communicate the acknowledgement via a wired or optical communication to the first device 102. In these or other implementations, and although not illustrated in FIG. 1E, the second device 104 may communicate the acknowledgement to one or more other devices that may be part of and/or control communications within the wireless network 110. In some implementations, the acknowledgement may indicate how much of and/or which data of the first frame was received by the second device 104 prior to termination of transmission of the first frame.

Additionally, although not expressly illustrated in FIG. 1E, in some implementations, during the transmission time frame of the first frame, the third device 106 and/or the fourth device 108 may also be configured to monitor whether transmission of the termination signal has occurred. For example, during the transmission time frame of the first frame, the transceiver systems 112c and 112d may receive wireless signals transmitted over the particular channel (e.g., the first signal packet or the termination signal) and may direct the received wireless signals to the T.S. detectors 114c and 114d, respectively. Like the T.S. detector 114b, the T.S. detectors 114c and 114d may monitor the received signals for a particular detection property to determine whether the termination signal has been received. In these or other implementations, the third device 106 and the fourth device 108 may acknowledge reception of the termination signal.

The monitoring and detection of the termination signal by the third device 106 and/or the fourth device 108 may also allow for the transmission of another frame (e.g., the second frame) over the particular wireless channel. For example, during transmission of the first frame, the third device 106 and/or the fourth device 108 may be in a reduced power state in which they may not be actively waiting for reception of another frame. As such, data of a different frame intended for them that is transmitted while they are in this state may not be properly processed. Further, while in this state, the third device 106 and/or the fourth device 108 may not be in a state to begin transmission of another frame. However, in response to reception and recognition of the termination signal, the third device 106 and/or the fourth device 108 may change a corresponding state to enable reception of another frame that may be intended for them or to enable transmission of another frame that they may be designated to transmit (e.g., the higher priority frame for which transmission of the particular frame is prematurely terminated). In contrast, without the reception and recognition of the termination signal, the third device 106 and/or the fourth device 108 may remain in the reduced-power state until after the originally allocated transmission time of the entire first frame has ended (e.g., as determined by the third device 106 and/or the fourth device 108 from the header data of the first frame).

In some implementations, the devices of the wireless network 110 may prepare for the communication of another frame (e.g., the higher priority second frame) in response to transmission of the termination signal. For example, at operation 188, after transmitting the termination signal, the first device 102 may begin transmitting the second frame (e.g., via a second signal packet) in instances in which the first device 102 is designated to transmit the second frame.

As another example not illustrated in FIG. 1E, in response to transmitting the termination signal, the first device 102 may transition to a receive state that is ready for reception of frames in instances in which the first device 102 is not designated to transmit the next frame. As such, the first device 102 may be prepared to receive the second frame in instances in which the second frame is intended for the first device 102. In some implementations, the first device 102 may be configured to prepare for the communication of the second frame in response to receiving the acknowledgment of receipt of the termination signal at operations 184 and 186.

As another example, the second device 104 may prepare for the possible reception of the other frame in response to identifying reception of the termination signal. For example, as indicated above, the second device 104 may reset its receive state machine at operation 180 as part of the preparation. In these or other implementations, at operation 188, the second device 104 may perform any suitable receive operation with respect to the second frame in instances in which the second frame is transmitted to the second device 104.

Additionally or alternatively, as another example not expressly illustrated in FIG. 1E, the second device 104 may transition to a transmit state in instances in which the second device 104 is designated to transmit the second frame. In response to identifying reception of the termination signal, the third device 106 and/or fourth device 108 may similarly prepare to transmit or possibly receive the next frame depending on whether they are designated to transmit the next frame.

In some implementations, the first device 102 may be configured to transmit the unsent data of the prematurely terminated first frame at a later time. For example, the first device 102 may transmit the unsent data to the second device 104 after the transmission of a superseding, higher priority, frame has finished. Additionally or alternatively, the first device 102 may transmit the unsent data after a protected time slot that prompted early termination has expired. In these or other implementations, the transmission of the unsent data may be part of a new frame transmitted via a new signal packet.

For example, at operation 190, the first device 102 may transmit a third frame to the second device 104 (e.g., via a third signal packet) in which the third frame includes the unsent data of the first frame. In some instances, the third frame may include some of the data of the first frame that was already sent during operation 170. Additionally or alternatively, the third frame may include other data that was not designated for transmission with the first frame. In some implementations, the first device 102 may know which data of the first frame to send based on data provided by the second device 104 with respect to which data of the first frame was received. Additionally or alternatively, the first device 102 may be configured to determine which of the data of the first frame to send in the third frame based on an analysis of when the first device 102 terminated transmission of the first frame.

Modifications, additions, or omissions may be made to the sequence 160 without departing from the scope of the present disclosure. For example, the order of some of the operations may be different than from that described herein. Additionally, although the first frame and the second frame are illustrated as being transmitted between the same devices (e.g., the first device 102 and the second device 104), the first frame and the second frame may be communicated between one or more different devices. For example, the second frame may be transmitted by the first device 102 to the third device 106 or the fourth device 108; the second frame may be transmitted by the second device 104 to the first device 102, the third device 106, or the fourth device 108; the second frame may be transmitted by the third device 106 to the first device 102, the second device 104, or the fourth device 108; or the second frame may be transmitted by the fourth device 108 to the first device 102, the second device 104, or the third device 106. Additionally or alternatively, the transmission of the first frame may be terminated and there may not be transmission of a second frame prior to transmitting the remaining unsent data of the first frame in the third frame.

Further, the particular scenario described with respect to FIG. 1E is merely an example and not meant to be limiting. For example, implementations of the present disclosure related to transmitting a termination signal may apply in any suitable situation within any suitable network in which the transmission of a frame may be intentionally cut short and are not limited to only contention-based networks and the particular reasons for terminating a frame described herein.

Figure 2:
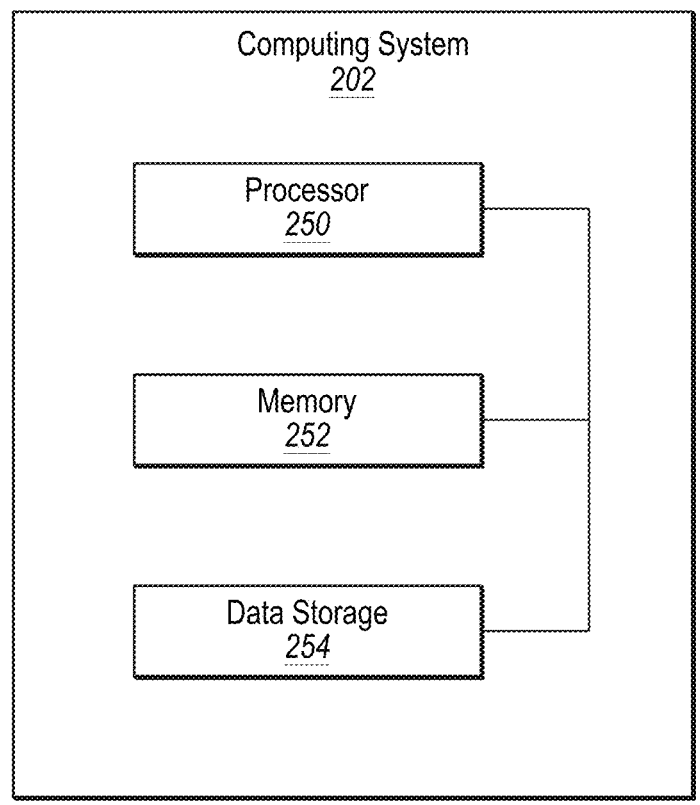
FIG. 2 illustrates a block diagram of an example computing system that may be used to perform or direct performance of one or more operations described according to at least one implementation of the present disclosure.

FIG. 2 illustrates a block diagram of an example computing system 202 that may be used to perform or direct performance of one or more operations described according to at least one implementation of the present disclosure. The computing system 202 may be included in the first device 102, the second device 104, the third device 106, and/or the fourth device 108 of FIG. 1A in some implementations. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor in FIG. 2, the processor 250 may include any number of processors configured to, individually or collectively, perform or direct performance of any number of operations described in the present disclosure.

In some implementations, the processor 250 may be configured to interpret and/or execute computer-executable instructions and/or process data stored in the memory 252, the data storage 254, or the memory 252 and the data storage 254. In some implementations, the processor 250 may fetch computer-executable instructions from the data storage 254 and load the computer-executable instructions in the memory 252. After the computer-executable instructions are loaded into memory 252, the processor 250 may execute the computer-executable instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some implementations, the computing system 202 may include any number of other components that may not be explicitly illustrated or described.

Figure 3:
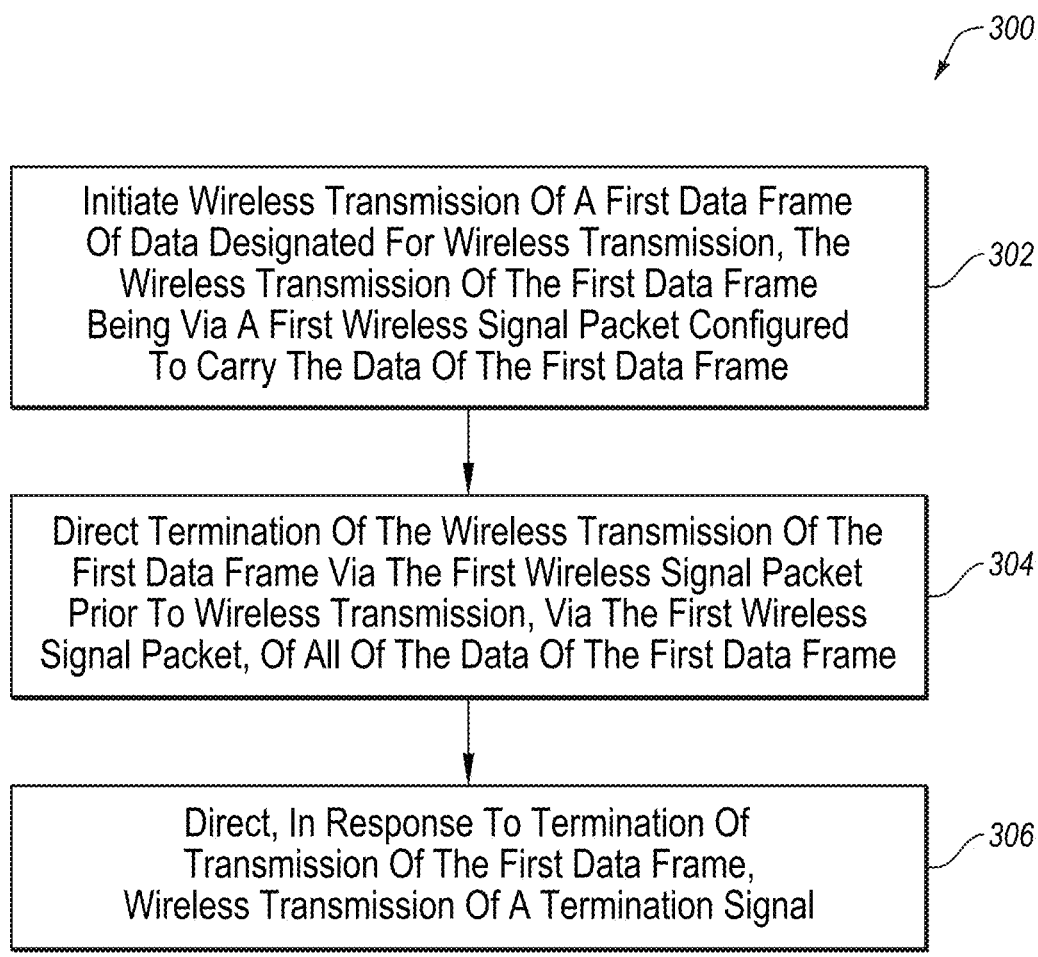
FIG. 3 is a flowchart of an example method of terminating transmission of a data frame.

FIG. 3 is a flowchart of an example method 300 of terminating transmission of a data frame, according to at least one implementation described in the present disclosure. The method 300 may be performed by any suitable system, apparatus, or device. For example, the method 300 may be performed by one or more of the devices of FIG. 1A. Additionally or alternatively, one or more of the operations may be performed or directed for performance by a computing system, such as the computing system 202 of FIG. 2. Although illustrated with discrete blocks, the steps and operations associated with one or more of the blocks of the method 300 may be divided into additional blocks, combined into fewer blocks, or eliminated, depending on the particular implementation. Further, one or more of the operations of method 300 may be performed as part of the sequence 160 of FIG. 1E.

At block 302, wireless transmission of a first data frame may be initiated. Data of the first data frame may be designated for wireless transmission via a first wireless signal packet configured to carry the data of the first data frame. At block 302, in some implementations, transmission of the first wireless signal packet may begin in response to the initiating of wireless transmission.

At block 304, termination of the wireless transmission of the first data frame via the first wireless signal packet may be directed. The directing of termination may be prior to wireless transmission, via the first wireless signal packet, of all of the data of the first data frame. In some implementations, the directing the termination of the wireless transmission of the first data frame (and subsequent termination of transmission of the first data frame via termination of the first signal packet) may be in response to a determination that a time of transmission of at least a portion of the data of the first data frame, via the first wireless signal packet, is within a protected wireless communication time slot. Additionally or alternatively, the directing the termination of the wireless transmission of the first data frame (and subsequent termination of transmission of the first data frame via termination of the first signal packet) may be in response to the first data frame having a lower transmission priority than a second data frame scheduled for wireless transmission. The termination of the wireless transmission of the first data frame may include termination of transmission of the first wireless signal packet prior to complete transmission of the first signal packet in some implementations and may be performed in response to the directing.

At block 306, wireless transmission of a termination signal may be directed. The directing of the transmission of the termination signal may be in response to termination of transmission of the first data frame. The termination signal may indicate that transmission of the first data frame, via the first wireless signal packet, terminated prior to completion of transmission of all of the data of the first data frame via the first wireless signal packet. Accordingly, the termination signal may also indicate that transmission of the first signal packet terminated prior to complete transmission of the data of the first data frame. In some implementations, the termination signal may be transmitted at block 306 in response to the directing of transmission of the termination signal. In some implementations, the termination signal may include a signal sequence that has a particular detection property that a receiving device is configured to recognize as corresponding to termination of wireless transmission of the first data frame or termination of first wireless signal packet.

Modifications may be made to the method 300 without departing from the scope of the present disclosure. For example, in some implementations, some of the operations of the method 300 may be in a different order than described. Further, additional operations may be included in the method 300 or one or more operations may be omitted.

For instance, the method 300 may include directing wireless transmission of the higher priority second data frame after transmission of the first data frame has been terminated. Further, the method 300 may include transmission of the second data frame in response to a receiving device acknowledging receipt of the termination signal. In addition, the method 300 may include directing wireless transmission, via another wireless signal packet, of (and/or the actual transmission of) a previously unsent portion of the data of the first data frame that was not sent prior to termination of wireless transmission of the first data frame. Additionally or alternatively, the method 300 ma include directing the wireless transmission of (and/or the actual transmission of) the previously unsent portion of the data is in response to transmission of the higher priority second data frame being finished and/or in response to the protected time slot expiring.

Figure 4:
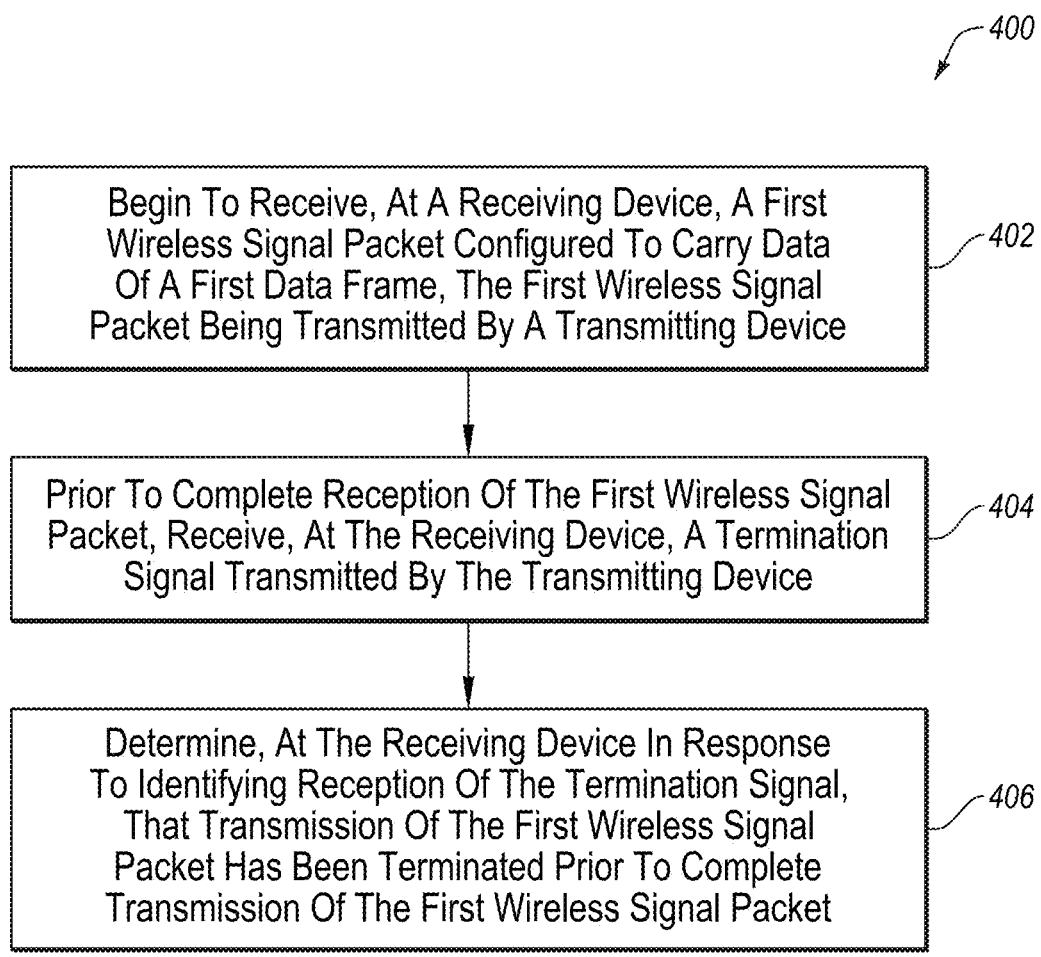
FIG. 4 is a flowchart of an example method of receiving a termination signal.

FIG. 4 is a flowchart of an example method 400 of receiving a termination signal, according to at least one implementation described in the present disclosure. The method 400 may be performed by any suitable system, apparatus, or device. For example, the method 400 may be performed by one or more of the devices of FIG. 1A. Additionally or alternatively, one or more of the operations may be performed or directed for performance by a computing system, such as the computing system 202 of FIG. 2. Although illustrated with discrete blocks, the steps and operations associated with one or more of the blocks of the method 400 may be divided into additional blocks, combined into fewer blocks, or eliminated, depending on the particular implementation. Further, one or more of the operations of method 400 may be performed as part of the sequence 160 of FIG. 1E.

At block 402, a receiving device may begin to receive a first wireless signal packet configured to carry data of a first data frame. The first wireless signal packet may be transmitted by a transmitting device. The terms "receiving device" and "transmitting device" are used with respect to reception and transmission of the first wireless signal packet and do not foreclose the "receiving device" from being able to perform transmitting operations, or vice versa.

At block 404, the receiving device may receive a termination signal transmitted by the transmitting device. The termination signal may be received prior to complete reception of the first wireless signal packet and may indicate that the first wireless signal packet terminated prior to complete transmission of the first wireless signal packet. The termination signal may include a signal sequence that has a particular detection property and the identifying of reception of the termination signal may be in response to recognizing the particular detection property in the received termination signal. In some implementations, the receiving device may monitor for the termination signal while processing the data of the first data frame that is received via reception of the first wireless signal packet. Additionally or alternatively, the monitoring may be performed in parallel with processing the data.

At block 406, the receiving device may determine, in response to identifying reception of the termination signal, that transmission of the first wireless signal packet has been terminated prior to complete transmission of the first wireless signal packet. In these or other implementations, the receiving device may prepare to receive a second wireless signal packet in response to determining that the transmission of the first wireless signal packet has been terminated. In some implementations, the receiving device may prepare by resetting a receive state machine of the receiving device.

Modifications may be made to the method 400 without departing from the scope of the present disclosure. For example, in some implementations, some of the operations of the method 400 may be in a different order than described. Further, additional operations may be included in the method 400 or one or more operations may be omitted.

For instance, the method 400 may include receiving a second wireless signal packet after wireless transmission of a second data frame that is prioritized over the first data frame has finished. The second wireless signal packet may carry a previously unreceived portion of the data of the first data frame that was not received prior to termination of the first wireless signal packet.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein (e.g., one or more of the devices of FIG. 1A). This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example The following is a non-limiting summary of some example implementations presented herein.

Example 1. A method comprising:
  initiating wireless transmission of a first data frame of data designated for wireless transmission, the wireless transmission of the first data frame being via a first wireless signal packet configured to carry the data of the first data frame;
  directing termination of the wireless transmission of the first data frame via the first wireless signal packet prior to wireless transmission, via the first wireless signal packet, of all of the data of the first data frame; and
  directing, in response to termination of transmission of the first data frame, wireless transmission of a termination signal, the termination signal indicating that transmission of the first data frame via the first wireless signal packet terminated prior to completion of transmission of all of the data of the first data frame via the first wireless signal packet.

Example 2. A method comprising:
  beginning to receive, at a receiving device, a first wireless signal packet configured to carry data of a first data frame, the first wireless signal packet being transmitted by a transmitting device;
  prior to complete reception of the first wireless signal packet, receiving, at the receiving device, a termination signal transmitted by the transmitting device, the termination signal interrupting the first wireless signal packet and indicating that the first wireless signal packet terminated prior to complete transmission of the first wireless signal packet; and
  determining, at the receiving device in response to identifying reception of the termination signal, that transmission of the first wireless signal packet has been terminated prior to complete transmission of the first wireless signal packet.

Example 3. A system comprising:
hardware configured to perform operations, the operations comprising:
begin transmission of a first wireless signal packet configured to carry data of a first data frame designated for wireless transmission;
terminate transmission of the first wireless signal packet prior to complete transmission of the data of the first data frame via the first wireless signal packet; and
transmit a termination signal, the termination signal indicating that transmission of the first wireless signal packet has been terminated prior to complete transmission of the data of the first data frame.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B." This interpretation of the phrase "A or B" is still applicable even though the term "A and/or B" may be used at times to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method, comprising:
initiating wireless transmission of a first data frame of data designated for wireless transmission;
before completing transmission of the first data frame, directing termination of the wireless transmission of the first data frame;
generating, in response to the termination of the wireless transmission of the first data frame, a termination signal, the termination signal indicating that the wireless transmission of the first data frame terminated prior to completion of transmission of the first data frame; and
identifying a second data frame, wherein the termination of the transmission of the first data frame is generated in view of the second data frame.

2. The method of claim 1, wherein the termination of the wireless transmission of the first data frame occurs at any amount of time between initiating the wireless transmission of the first data frame and before completing transmission of the first data frame.

3. The method of claim 1 further comprising sending the termination signal to one or more devices.

4. The method of claim 1 further comprising sending the termination signal to an intended receiver of the wireless transmission of the first data frame.

5. The method of claim 4, the termination signal to indicate to the intended receiver of the wireless transmission of an intentional termination of the wireless transmission of the first data frame.

6. The method of claim 1 further comprising inserting the termination signal in a data stream immediately after directing termination of the wireless transmission of the first data frame.

7. The method of claim 1, the termination signal to indicate an end of the first data frame.

8. The method of claim 1, the termination signal including an auto-correlation property.

9. The method of claim 1, the first data frame having a first priority, the second data frame having a second priority, wherein the termination of the wireless transmission of the first data frame is generated in view of a comparison of the first priority and the second priority.

10. The method of claim 1, wherein the termination of the wireless transmission of the first data frame is generated in view of a time-sensitive property of the second data frame.

11. The method of claim 1, wherein the termination of the wireless transmission of the first data frame is initiated in response to receiving an instruction from a different networking layer.

12. A system, comprising:
one or more processors;
one or more non-transitory computer-readable media containing instructions which, when executed by the one or more processors, cause the system to perform operations, the operations comprising:
initiate wireless transmission of a first data frame of data designated for wireless transmission;
before completing transmission of the first data frame, direct termination of the wireless transmission of the first data frame;
generate, in response to the termination of the wireless transmission of the first data frame, a termination signal, the termination signal indicating that transmission of the first data frame terminated prior to completion of transmission of the first data frame; and identify a second data frame, wherein the termination of the wireless transmission of the first data frame is generated in view of the second data frame.

13. The system of claim 12, wherein the termination of the wireless transmission of the first data frame occurs at any amount of time between initiating the wireless transmission of the first data frame and before completing transmission of the first data frame.

14. The system of claim 12 further comprising sending the termination signal to an intended receiver of the wireless transmission of the first data frame.

15. The system of claim 14, the termination signal to indicate to the intended receiver of the wireless transmission of an intentional termination of the wireless transmission of the first data frame.

16. The system of claim 12, the termination signal to indicate an end of the first data frame.

17. The system of claim 12, the first data frame having a first priority, the second data frame having a second priority, wherein the termination of the wireless transmission of the first data frame is generated in view of a comparison of the first priority and the second priority.

18. The system of claim 12, wherein the termination of the wireless transmission of the first data frame is generated in view of a time-sensitive property of the second data frame.

* * * * *